US009697770B2

(12) United States Patent
Ma

(10) Patent No.: US 9,697,770 B2
(45) Date of Patent: Jul. 4, 2017

(54) PIXEL CIRCUIT, ORGANIC ELECTROLUMINESCENT DISPLAY PANEL AND DISPLAY DEVICE

(71) Applicant: Boe Technology Group Co., Ltd., Beijing (CN)

(72) Inventor: Zhanjie Ma, Beijing (CN)

(73) Assignee: Boe Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/913,277

(22) PCT Filed: Aug. 19, 2015

(86) PCT No.: PCT/CN2015/087526
§ 371 (c)(1),
(2) Date: Feb. 19, 2016

(87) PCT Pub. No.: WO2016/155207
PCT Pub. Date: Oct. 6, 2016

(65) Prior Publication Data
US 2017/0039934 A1 Feb. 9, 2017

(30) Foreign Application Priority Data
Apr. 3, 2015 (CN) .......................... 2015 1 0158794

(51) Int. Cl.
*G06F 3/038* (2013.01)
*G09G 3/3233* (2016.01)
(Continued)

(52) U.S. Cl.
CPC ......... *G09G 3/3233* (2013.01); *G09G 3/2007* (2013.01); *G09G 3/32* (2013.01);
(Continued)

(58) Field of Classification Search
USPC ........................................................ 345/212
See application file for complete search history.

(56) References Cited

U.S. PATENT DOCUMENTS

2006/0114193 A1 6/2006 Kwak et al.
2012/0306374 A1 12/2012 Lee et al.

FOREIGN PATENT DOCUMENTS

CN 1779767 5/2006
CN 101000739 7/2007
(Continued)

OTHER PUBLICATIONS

Office action from Chinese Application No. 201510158794.9 dated Sep. 19, 2016.

(Continued)

*Primary Examiner* — Gustavo Polo
(74) *Attorney, Agent, or Firm* — Calfee, Halter & Griswold LLP

(57) ABSTRACT

A pixel circuit, an organic electroluminescent display panel and a display device. The pixel circuit comprises: a drive transistor, a drive control module, at least two split light emitting control modules and light emitting devices connected with output terminals of the split light emitting control modules in one-to-one correspondence respectively. Since the plurality of split light emitting control modules can split the driving total current signal outputted by the drive transistor based on the corresponding split control signal, the driving split current signal outputted to the corresponding light emitting device can be less than the driving total current signal. Thus, the driving current of the light emitting device under the same brightness can be reduced, thereby being capable of realizing adjustment of various gray scale display of the high current efficiency light emitting device.

20 Claims, 13 Drawing Sheets

(51) Int. Cl.
*G09G 3/32* (2016.01)
*G09G 3/20* (2006.01)

(52) U.S. Cl.
CPC ............... *G09G 2300/0819* (2013.01); *G09G 2320/045* (2013.01)

(56) References Cited

FOREIGN PATENT DOCUMENTS

| | | |
|---|---|---|
| CN | 101075410 | 11/2007 |
| CN | 101772237 | 7/2010 |
| CN | 103000131 | 3/2013 |
| CN | 103000132 | 3/2013 |
| CN | 104732926 | 6/2015 |
| JP | 2010097041 | 4/2010 |
| WO | 2006/125718 | 11/2006 |

OTHER PUBLICATIONS

International Search Report and Written Opinion from PCT/CN2015/087526 dated Dec. 21, 2015.

PIXEL CIRCUIT, ORGANIC ELECTROLUMINESCENT DISPLAY PANEL AND DISPLAY DEVICE

RELATED APPLICATIONS

The present application is the U.S. national phase entry of PCT/CN2015/087526 with an International filing date of Aug. 19, 2015, which claims the benefit of Chinese Application No. 201510158794.9, filed Apr. 3, 2015, the entire disclosures of which are incorporated herein by reference.

FIELD OF THE INVENTION

The present invention relates to the field of organic electroluminescent technology, particularly to a pixel circuit, an organic electroluminescent display panel and a display device.

BACKGROUND OF THE INVENTION

The organic light emitting diode (OLED) display is one of the hotspots in the current research field of panel display. Compared with the liquid crystal display, the OLED display has the advantages of low power consumption, low production cost, self-luminous, wide visual angle and high response speed. At present, in the panel display field such as mobile phone, PDA, digital camera, the OLED display has begun to replace the conventional liquid crystal display (LCD). The pixel circuit design is the core technical content of the OLED display and has important research significance.

Different from the LCD that uses voltage to control the brightness, the OLED belongs to current driving, which needs to be controlled to emit light using current. For example, the existing 2T1C pixel circuit, as shown in FIG. 1, the circuit comprises a drive transistor T2, a switch transistor T1, a storage capacitance Cs and an OLED. The switch transistor T1 plays the function of a switch, the drive transistor T2 plays the function of controlling the current flowing through the OLED. When the OLED emits light, from the saturation current formula of the drive transistor T2: $I=K(V_{GS}-V_{th})^2=K(V_{Data}-V_{DD}-V_{th})^2$ it can be seen that the current of the drive transistor T2 is determined by the difference value between the voltage $V_{Data}$ of the data signal Data and the voltage $V_{DD}$ of the DC voltage signal VDD. The DC voltage signal VDD is a constant signal, hence, the main factor that determines the current of the drive transistor T2 is the voltage $V_{Data}$ of the data signal Data.

However, with the continuous increase of the current efficiency of the OLED, the current that needs to be supplied by the drive transistor T2 for the same brightness becomes smaller and smaller. This causes the range of the required voltage $V_{Data}$ of the data signal Data smaller and smaller in order to realize 256 gray scale display, particularly the voltage required for realizing the minimum gray scale will become very small, thereby making it very difficult for the drive IC to provide such a small voltage value accurately.

SUMMARY OF THE INVENTION

In order to solve the above technical problem, the embodiments of the present invention provides a pixel circuit, an organic electroluminescent display panel and a display device, for realizing adjustment of various gray scale display of the high current efficiency light emitting device.

An embodiment of the present invention provides a pixel circuit, comprising: a drive transistor, a drive control module, at least two split light emitting control modules and light emitting devices connected with output terminals of the split light emitting control modules in one-to-one correspondence respectively.

An input terminal of the drive control module is used for receiving a drive control signal, a first output terminal of the drive control module is connected with a gate of the drive transistor, a second output terminal of the drive control module is connected with a source of the drive transistor. The drive control module is used for controlling the drive transistor to output a driving total current signal under the control of the drive control signal.

A first input terminal of each of the split light emitting control modules is connected with a drain of the drive transistor, a second input terminal thereof is used for receiving a corresponding split control signal, a third input terminal thereof is used for receiving a corresponding light emitting control signal, an output terminal thereof is connected with one end of a corresponding light emitting device. The other end of the light emitting device is connected with a first reference voltage source. Each of the split light emitting control modules is used for splitting the driving total current signal outputted by the drain of the drive transistor according to the corresponding split control signal under the control of the corresponding light emitting control signal, forming a driving split current signal to which the corresponding split control signal corresponds, and providing the formed driving split current signal to the corresponding light emitting device.

In a possible implementing mode, in the above pixel circuit provided by an embodiment of the present invention, the split light emitting control module comprises: a first switch transistor, a first capacitor and a second switch transistor.

A gate of the first switch transistor is connected with the third input terminal of the split light emitting control module, a source thereof is connected with the second input terminal of the split light emitting control module, a drain thereof is connected with a gate of the second switch transistor and a first end of the first capacitor.

A source of the second switch transistor is connected with the first input terminal of the split light emitting control module, a drain thereof is connected with the output terminal of the split light emitting control module.

A second end of the first capacitor is connected with a second reference voltage source.

In the above pixel circuit provided by an embodiment of the present invention, each of the split light emitting control modules can correspond to a same light emitting control signal.

In the above pixel circuit provided by an embodiment of the present invention, the first switch transistor and the second switch transistor can be both P-type transistors or N-type transistors.

In the above pixel circuit provided by an embodiment of the present invention, the drive transistor can be a P-type transistor or an N-type transistor.

In a possible implementing mode, in the above pixel circuit provided by an embodiment of the present invention, the drive control module comprises: a second capacitor and a third switch transistor.

A gate of the third switch transistor is used for receiving the drive control signal, a source thereof is used for receiving a data signal, a drain thereof is connected with a first end of the second capacitor and the gate of the drive transistor respectively.

A second end of the second capacitor is connected with a third reference voltage source and the source of the drive transistor respectively.

In the above pixel circuit provided by an embodiment of the present invention, the drive control module is further used for compensating a threshold voltage of the drive transistor; and/or compensating a power supply voltage drop.

In a possible implementing mode, in the above pixel circuit provided by an embodiment of the present invention, the drive control module comprises: a second capacitor, an initialization sub module, a driving sub module and a compensation sub module.

A first input terminal of the initialization sub module is used for receiving an initialization control signal, a second input terminal thereof is used for receiving an initialization signal, an output terminal thereof is connected with the gate of the drive transistor. The initialization sub module is used for providing the initialization signal to the gate of the drive transistor under the control of the initialization control signal.

A first input terminal of the compensation sub module is used for receiving a compensation control signal, a second input terminal thereof is used for receiving a data signal, a first output terminal thereof is connected with a first end of the second capacitor, a second output terminal thereof is connected with a second end of the second capacitor, a third input terminal thereof is connected with the drain of the drive transistor. The compensation sub module is used for transmitting the data signal to the first end of the second capacitor and transmitting the threshold voltage of the drive transistor to the second end of the second capacitor under the control of the compensation control signal.

A first input terminal of the driving sub module is used for receiving the drive control signal, a second input terminal thereof is connected with the source of the drive transistor and a fourth reference voltage source respectively, an output terminal thereof is connected with the first end of the second capacitor. The driving sub module is used for controlling the drive transistor to output a driving total current in cooperation with the second capacitor under the control of the drive control signal.

In a possible implementing mode, in the above pixel circuit provided by an embodiment of the present invention, the initialization sub module comprises: a third switch transistor.

A gate of the third switch transistor is connected with the first input terminal of the initialization sub module, a source thereof is connected with the second input terminal of the initialization sub module, a drain thereof is connected with the output terminal of the initialization sub module.

In a possible implementing mode, in the above pixel circuit provided by an embodiment of the present invention, the compensation sub module comprises: a fourth switch transistor and a fifth switch transistor.

A gate of the fourth switch transistor is connected with the first input terminal of the compensation sub module, a source thereof is connected with the second output terminal of the compensation sub module, a drain thereof is connected with the third input terminal of the compensation sub module.

A gate of the fifth switch transistor is connected with the first input terminal of the compensation sub module, a source thereof is connected with the second input terminal of the compensation sub module, a drain thereof is connected with the first output terminal of the compensation sub module.

In a possible implementing mode, in the above pixel circuit provided by an embodiment of the present invention, the driving sub module comprises: a sixth switch transistor.

A gate of the sixth switch transistor is connected with the first input terminal of the driving sub module, a source thereof is connected with the second input terminal of the driving sub module, a drain thereof is connected with the output terminal of the driving sub module.

An embodiment of the present invention further provides an organic electroluminescent display panel, comprising: pixel units arranged in a matrix and pixel circuits corresponding to respective pixel units, at least two adjacent pixel units along the row direction are taken as a pixel unit group, each of the pixel unit groups corresponds to any of the above pixel circuits provided by the embodiments of the present invention, and the number of pixel units in each of the pixel unit groups equals to the number of the split light emitting control modules in the corresponding pixel circuit.

An embodiment of the present invention further provides a display device comprising the above organic electroluminescent display panel provided by the embodiment of the present invention.

The embodiments of the present invention provide the above pixel circuit, organic electroluminescent display panel and display device. The pixel circuit comprises: a drive transistor, a drive control module, at least two split light emitting control modules and light emitting devices connected with output terminals of the split light emitting control modules in one-to-one correspondence respectively. Since the plurality of split light emitting control modules can split the driving total current signal outputted by the drive transistor based on the corresponding split control signal, the driving split current signal outputted to the corresponding light emitting device can be less than the driving total current signal. In this way, on the basis of not changing the adjustment range of the voltage in the prior art, the driving current of the light emitting device under the same brightness can be reduced, thereby being capable of realizing adjustment of various gray scale display of the high current efficiency light emitting device.

DETAILED DESCRIPTION OF THE INVENTION

Next, the specific implementing modes of the pixel circuit, the organic electroluminescent display panel and the display device provided by the embodiments of the present invention will be explained in detail with reference to the drawings.

Figure 2:
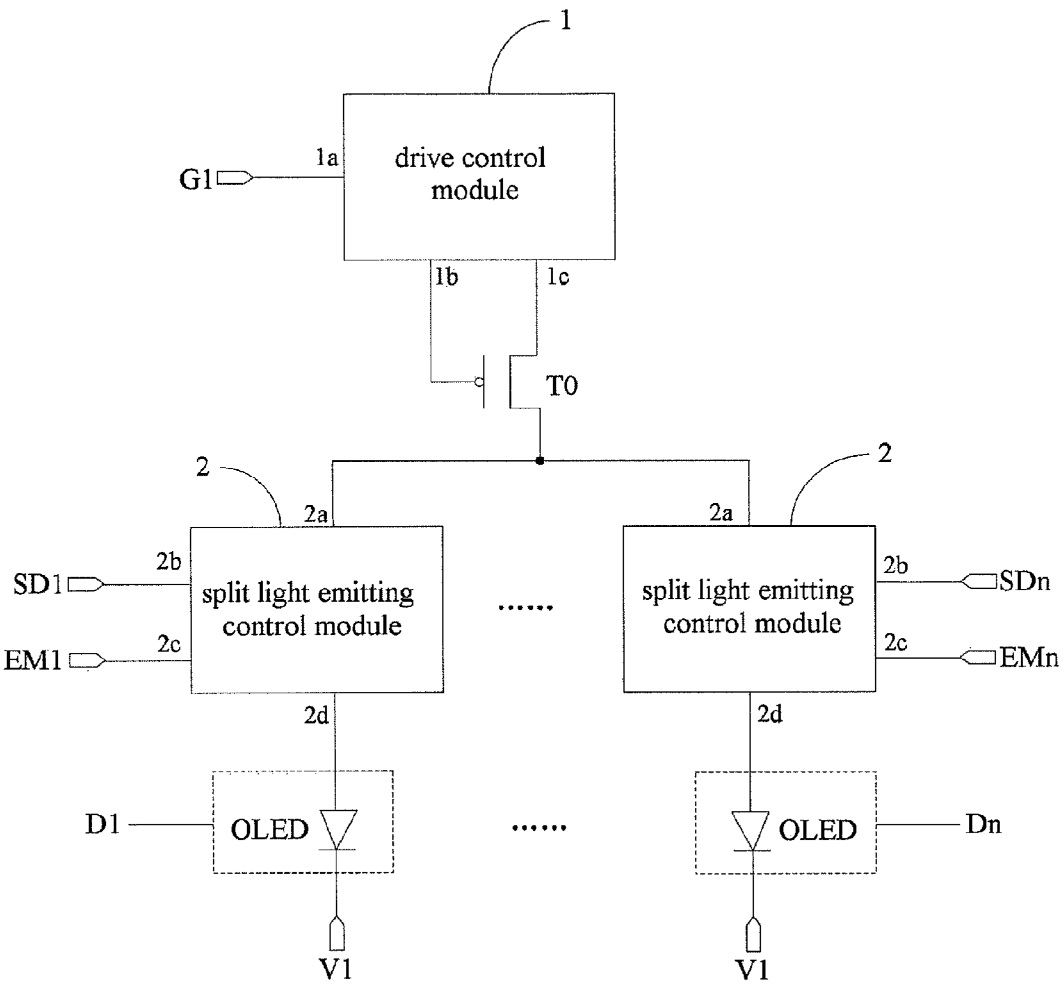
FIG. 2 is a structural schematic view of a pixel circuit provided by an embodiment of the present invention.

An embodiment of the present invention provides a pixel circuit, as shown in FIG. 2, comprising: a drive transistor T0, a drive control module 1, at least two split light emitting control modules 2 and light emitting devices D connected with output terminals 2*d* of the split light emitting control modules 2 in one-to-one correspondence respectively.

An input terminal 1*a* of the drive control module 1 is used for receiving a drive control signal G1, a first output terminal 1*b* thereof is connected with a gate of the drive transistor T0, a second output terminal 1*c* thereof is connected with a source of the drive transistor T0. The drive control module 1 is used for controlling the drive transistor T0 to output a driving total current signal under the control of the drive control signal G1.

A first input terminal 2*a* of each of the split light emitting control modules 2 is connected with a drain of the drive transistor T0, a second input terminal 2*b* thereof is used for receiving a corresponding split control signal SD, a third input terminal 2*c* thereof is used for receiving a corresponding light emitting control signal EM, an output terminal 2*d* thereof is connected with one end of a corresponding light emitting device D; the other end of the light emitting device D is connected with a first reference voltage source V1. Each of the split light emitting control modules 2 is used for splitting the driving total current signal outputted by the drain of the drive transistor T0 according to the corresponding split control signal SD under the control of the corresponding light emitting control signal EM, forming a driving split current signal to which the corresponding split control signal SD corresponds, and providing the formed driving split current signal to the corresponding light emitting device D.

The above pixel circuit provided by an embodiment of the present invention comprises: a drive transistor, a drive control module, at least two split light emitting control modules and light emitting devices connected with output terminals of the split light emitting control modules in one-to-one correspondence respectively. Since the plurality of split light emitting control modules can split the driving total current signal outputted by the drive transistor based on the corresponding split control signal, the driving split current signal outputted to the corresponding light emitting device can be less than the driving total current signal. In this way, on the basis of not changing the adjustment range of the voltage in the prior art, the driving current of the light emitting device under the same brightness can be reduced, thereby being capable of realizing adjustment of various gray scale display of the high current efficiency light emitting device.

Next, the present invention will be explained in detail with reference to specific embodiments. It needs to be explained that the respective embodiments aim to explaining the present invention better but not limiting the present invention.

The light emitting device in the above pixel circuit provided by an embodiment of the present invention is generally an organic light emitting diode OLED, which will not be defined here.

Figure 3A:
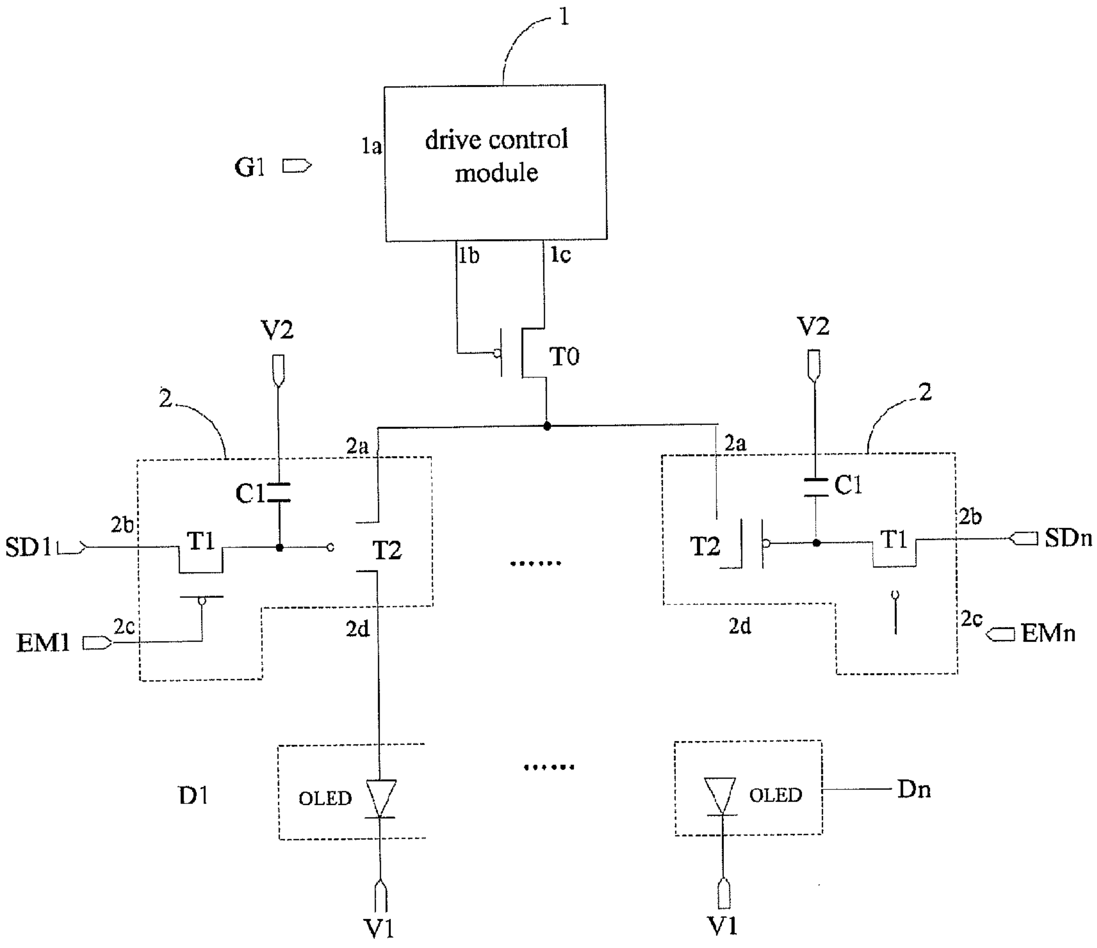
FIG. 3*a* is a first specific structural schematic view of a pixel circuit provided by an embodiment of the present invention.
Figure 3B:
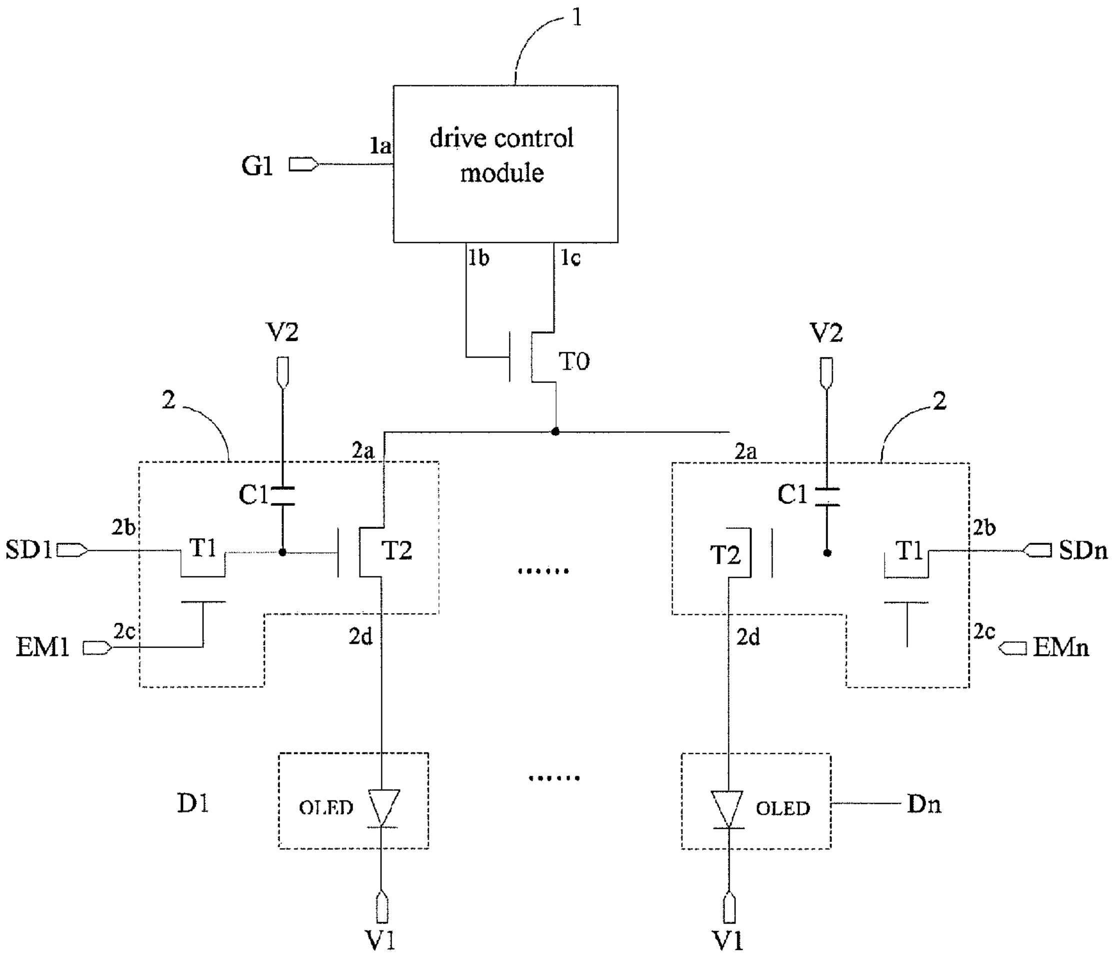
FIG. 3*b* is a second specific structural schematic view of a pixel circuit provided by an embodiment of the present invention.

In the above pixel circuit provided by an embodiment of the present invention, as shown in FIG. 3*a* and FIG. 3*b*, the split light emitting control module 2 can comprise: a first switch transistor T1, a first capacitor C1 and a second switch transistor T2.

A gate of the first switch transistor T1 is connected with the third input terminal 2*c* of the split light emitting control module 2, a source thereof is connected with the second input terminal 2*b* of the split light emitting control module 2, a drain thereof is connected with a gate of the second switch transistor T2 and a first end of the first capacitor C1.

A source of the second switch transistor T2 is connected with the first input terminal 2*a* of the split light emitting control module 2, a drain thereof is connected with the output terminal 2*d* of the split light emitting control module 2.

A second end of the first capacitor C1 is connected with a second reference voltage source V2.

In the above pixel circuit provided by an embodiment of the present invention, the working principle of the split light emitting control module is: when the first switch transistor is in the turn-on state under the control of the corresponding light emitting control signal, the corresponding split control signal is transmitted to the first end of the first capacitor through the first switch transistor and maintained. In this way, the turn-on degree of the second switch transistor can be controlled by the split control signal, thereby controlling the internal resistance of the second switch transistor by controlling the split control signal. Each split light emitting control module connected with the drive transistor and the corresponding light emitting device are equivalent to multiplex resistance connected in parallel between the drain of the drive transistor and the first reference voltage source, hence, the resistance in the loop formed by each split light emitting control module and the corresponding light emitting device can be controlled by adjusting the split control signal to which each split light emitting control module corresponds, thereby controlling the size of the driving split current assigned to each light emitting device by the driving total current outputted by the drain of the drive transistor.

Figure 4:
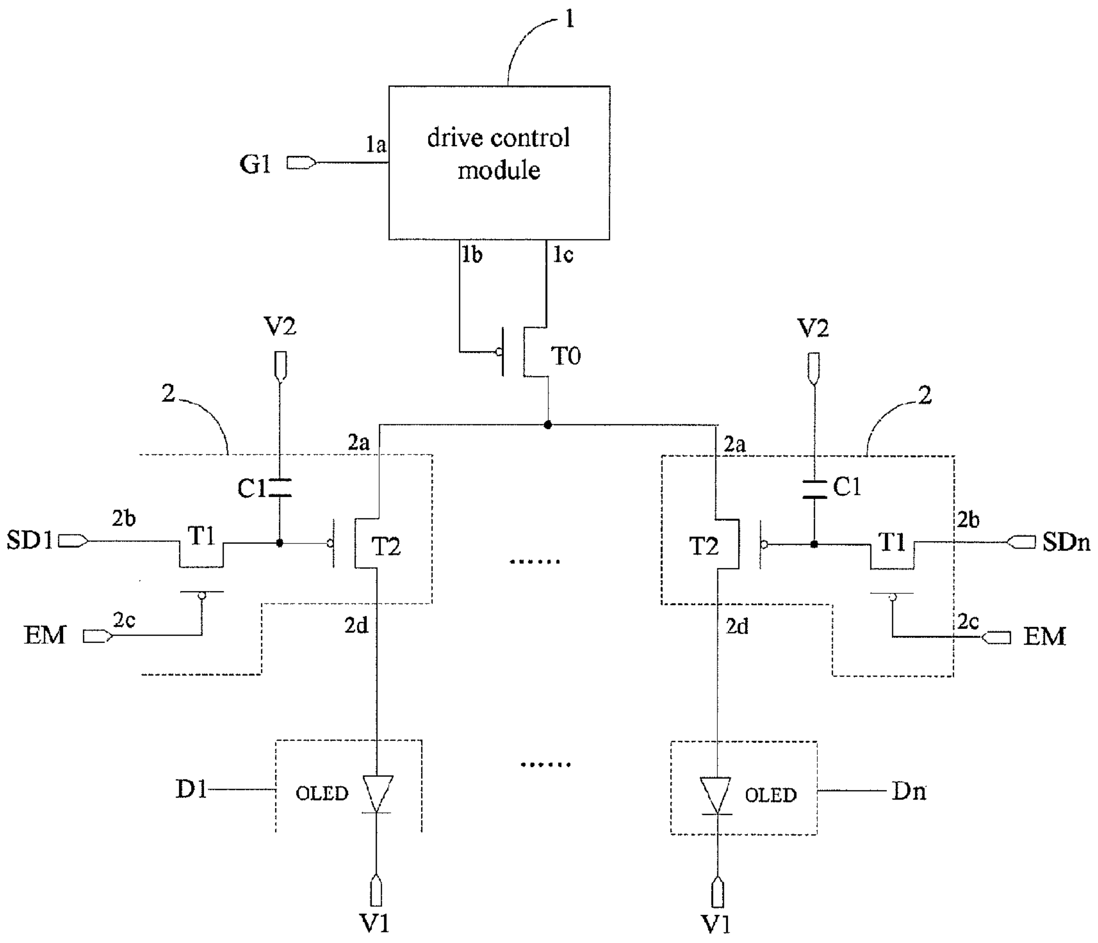
FIG. 4 is a third specific structural schematic view of a pixel circuit provided by an embodiment of the present invention.

In the above pixel circuit provided by an embodiment of the present invention, as shown in FIG. 4, each split light emitting control module 2 corresponds to a same light emitting control signal EM. That is to say, the third input terminal 2*c* of each split light emitting control module 2 receives the same light emitting control signal EM. In this way, when it needs to emit light, the light emitting control signal EM controls all the first switch transistors T1 to be in the turn-on state, the gray scale display of each light emitting device D can be realized only by adjusting the corresponding split control signal SD.

As shown in FIG. 3*a*, the first switch transistor T1 can be a P-type transistor. When the light emitting control signal EM is of a low level, the first switch transistor T1 is in the turn-on state, when the light emitting control signal EM is of a high level, the first switch transistor T1 is in the cut-off state. Alternatively, as shown in FIG. 3*b*, the first switch transistor T1 can also be an N-type transistor. When the light emitting control signal EM is of a high level, the first switch transistor T1 is in the turn-on state, when the light emitting control signal EM is of a low level, the first switch transistor T1 is in the cut-off state; it will not be defined here.

Similarly, as shown in FIG. 3*a*, the second switch transistor T2 can be a P-type transistor. When the split control signal SD is of a low level, the second switch transistor T2 is in the turn-on state, when the split control signal SD is of a high level, the second switch transistor T2 is in the cut-off state. Alternatively, as shown in FIG. 3*b*, the second switch transistor T2 can also be an N-type transistor. When the split control signal SD is of a high level, the second switch transistor T2 is in the turn-on state, when the split control signal SD is of a low level, the second switch transistor T2 is in the cut-off state; it will not be defined here.

In the above pixel circuit provided by an embodiment of the present invention, the second switch transistor is preferably a P-type transistor, because the turning on and transmitting signal performance of the P-type transistor is better.

In the above pixel circuit provided by an embodiment of the present invention, in order to simplify the fabricating process, as shown in FIG. 3*a*, the first switch transistor T1 and the second switch transistor T2 are both P-type transistors; or as shown in FIG. 3*b*, the first switch transistor T1 and the second switch transistor T2 are both N-type transistors.

The above is only illustration of the specific structure of the split light emitting control module in the pixel circuit, in specific implementation, the specific structure of the split light emitting control module is not limited to the above structure provided by the embodiment of the present invention, it can also be other structures known by the skilled person in the art, which will not be defined here.

Figure 1:
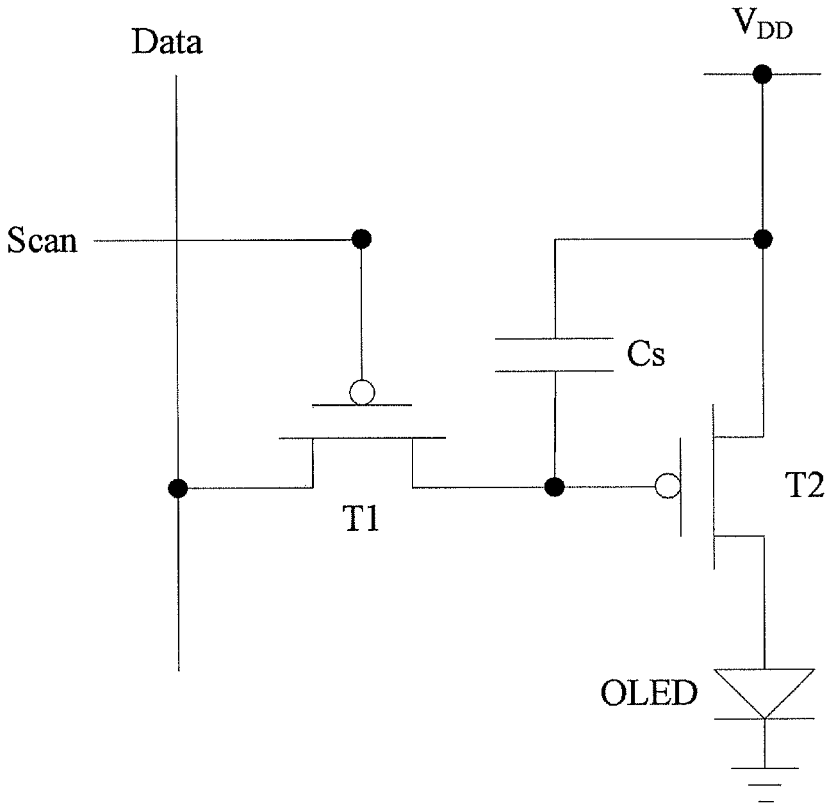
FIG. 1 is a structural schematic view of an existing pixel circuit.

It needs to be explained that the above pixel circuit provided by an embodiment of the present invention is applicable to any pixel circuit which outputs a driving current through the drive transistor. It is applicable no matter it is a pixel circuit having the function of compensating a threshold voltage of the drive transistor or a conventional pixel circuit as shown in FIG. 1, which will not be defined here.

In the above pixel circuit provided by an embodiment of the present invention, as shown in FIG. 3*a*, the drive transistor T0 can be a P-type transistor. Alternatively, as shown in FIG. 3*b*, the drive transistor T0 can also be an N-type transistor, which will not be defined here.

In order to simplify the fabricating process, the polarity of the drive transistor can be selected to be same as the polarity of the switch transistors in the split light emitting control module and the drive control module.

Next, by taking the example that the drive transistor is a P-type transistor, the working principle of the above pixel circuit provided by an embodiment of the present invention will be explained through specific embodiments.

Example I

Figure 5A:
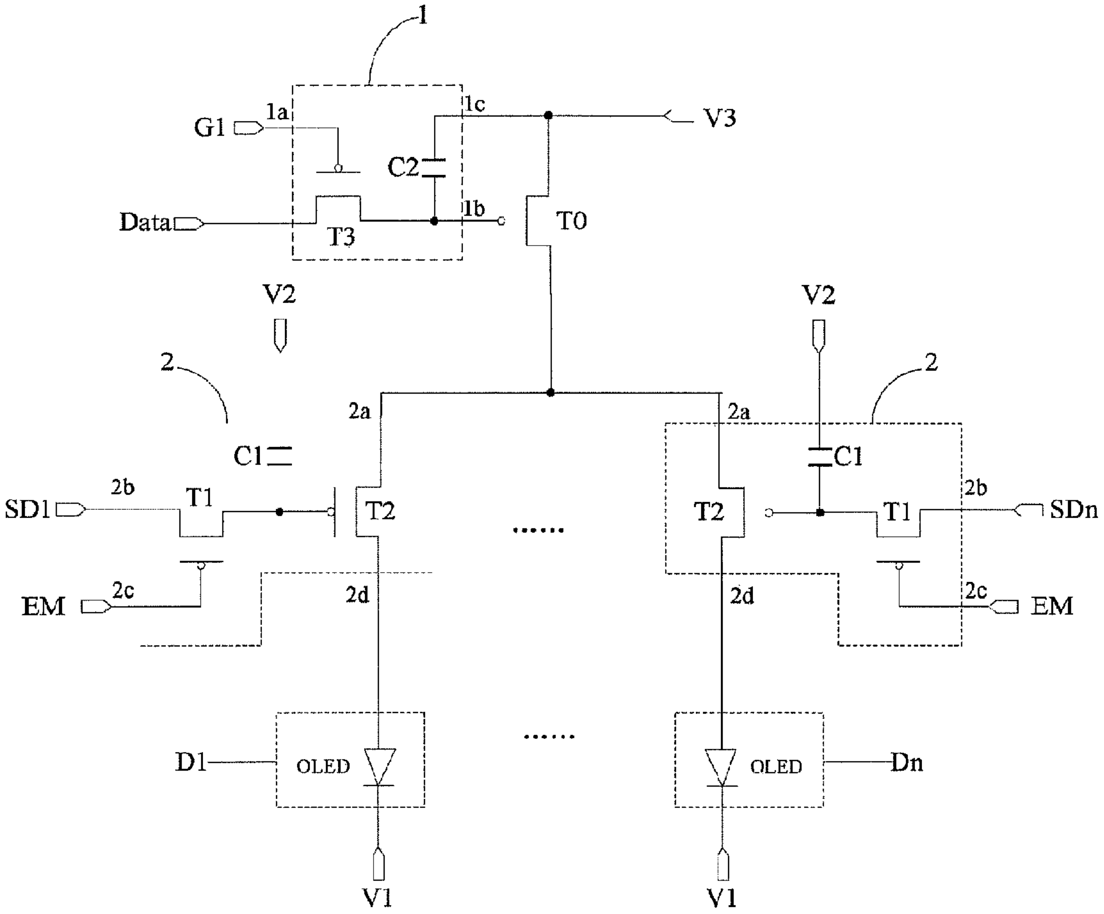
FIG. 5*a* is a fourth specific structural schematic view of a pixel circuit provided by an embodiment of the present invention.

As shown in FIG. 5*a*, in the above pixel circuit provided by an embodiment of the present invention, the drive control module 1 specifically comprises: a second capacitor C2 and a third switch transistor T3.

A gate of the third switch transistor T3 is used for receiving a drive control signal G1, a source thereof is used for receiving a data signal Data, a drain thereof is connected with a first end of the second capacitor C2 and the gate of the drive transistor T0 respectively. A second end of the second capacitor C2 is connected with a third reference voltage source V3 and the source of the drive transistor T0.

The third switch transistor T3 can be an N-type transistor, or the third switch transistor T3 can also be a P-type transistor, which will not be defined here.

In the above pixel circuit provided by an embodiment of the present invention, since the drive transistor T0 is a P-type transistor, the threshold voltage $V_{th}$ of the P-type transistor is a negative value. In order to ensure that the drive transistor T0 can work normally, the voltage of the first reference voltage source V1 is generally connected to the ground or a negative voltage, the voltage of the third reference voltage source V3 is generally a positive voltage.

Figure 5B:
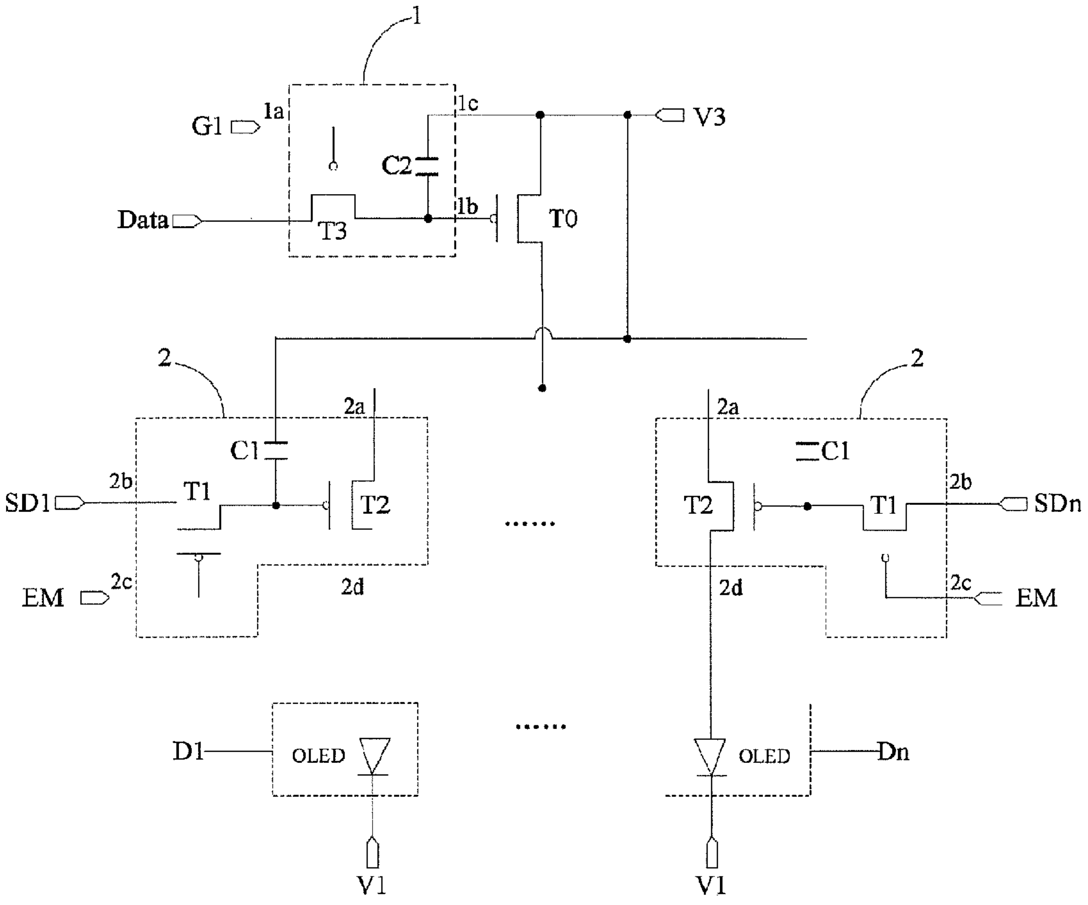
FIG. 5*b* is a fifth specific structural schematic view of a pixel circuit provided by an embodiment of the present invention.

As shown in FIG. 5*b*, the second reference voltage source V2 and the third reference voltage source V3 can be the same voltage source.

Figure 6:
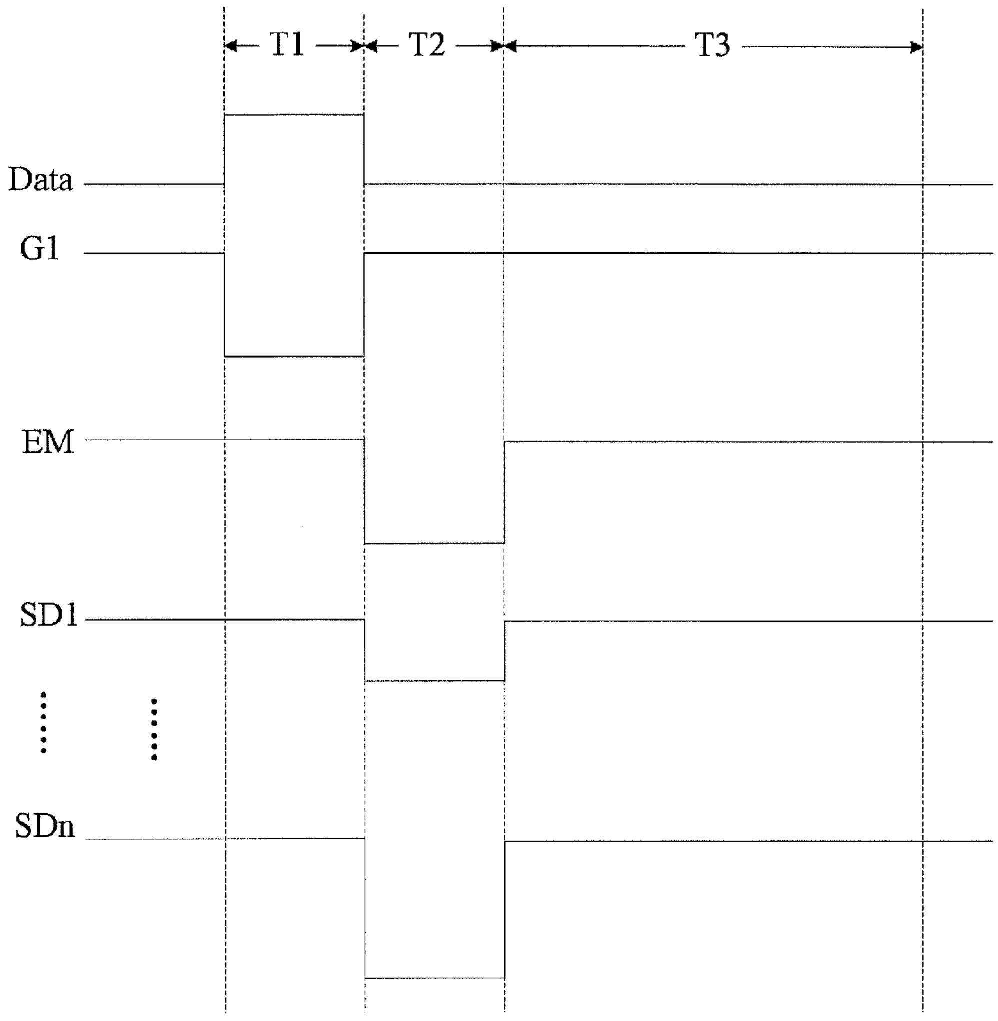
FIG. 6 is a timing schematic view of a pixel circuit as shown in FIG. 5*b;*

Next, the structure of the pixel circuit as shown in FIG. 5*b* will be taken as the example to describe its working process, the corresponding input timing diagram is as shown in FIG. 6. Three phases of T1, T2 and T3 in the input timing diagram as shown in FIG. 6 are selected. In the following description, the high level signal is represented by 1, the low level signal is represented by 0.

In the phase of T1, G1=0, SD1 to SDn=1, EM=1. All the first switch transistors T1 and all the second switch transistors T2 are in the cut-off state. The third switch transistor T3 is in the turn-on state. The voltage of the gate of the drive transistor T0 is $V_{Data}$, the voltage of the source of the drive transistor T0 is V3.

In the phase of T2, G1=1, SD1 to SDn=0, EM=0. The third switch transistor T3 is in the cut-off state. All the first switch transistors T1 are in the turn-on state. The turn-on degree of each second switch transistor T2 is determined by the corresponding SD. In this phase, due to the effect of the second capacitor C2, the voltage of the gate of the drive transistor T0 is still $V_{data}$, the voltage of the source of the drive transistor T0 is V3. The driving total current signal outputted by the drive transistor T0 is $I_{total}=K(V_{GS}-V_{th})^2=K(V_{Data}-V3-V_{th})^2$. Each light emitting device D emits light gradually under the control of the corresponding SD. Assume that there are only two split light emitting control modules in FIG. 5*b*, i.e., n=2. Under the control of SD1, the internal resistance of the second switch transistor T2 that corresponds to SD1 is R1. Under the control of SD2, the internal resistance of the second switch transistor T2 that corresponds to SD2 is R2. In this phase, the driving split current outputted by the second switch transistor T2 that corresponds to SD1 becomes $I_{total}R2/(R1+R2)$ gradually, the driving split current outputted by the second switch transistor T2 that corresponds to SD2 becomes $I_{total}R1/(R1+R2)$ gradually.

In the phase of T3, G1=1, SD1 to SDn=1, EM=1. The third switch transistor T3 and all the first switch transistors T1 are in the cut-off state. Due to the effect of the second capacitor C2, the voltage of the gate of the drive transistor T0 is still $V_{data}$, the voltage of the source of the drive transistor T0 is still V3. The driving total current signal outputted by the drive transistor T0 is still $I_{total}K(V_{Data}-V3-V_{th})^2$. Due to the effect of the first capacitor C1, the voltage of the gate of each second switch transistor T2 is still the corresponding SD in the phase of T2. Hence, in this phase, the driving split current outputted by the second switch transistor T2 that corresponds to SD1 is stabilized at $I_{total}R2/(R1+R2)$, the driving split current outputted by the second switch transistor T2 that corresponds to SD2 is stabilized at $I_{total}$R1/(R1+R2). Each light emitting device emits light stably.

In the above pixel circuit provided by the embodiment of the present invention, since the plurality of split light emitting control modules can split the driving total current signal outputted by the drive transistor based on the corresponding split control signal, the driving split current signal outputted to the corresponding light emitting device can be less than the driving total current signal. In this way, on the basis of not changing the adjustment range of the voltage in the prior art, the driving current of the light emitting device under the same brightness can be reduced, thereby being capable of realizing adjustment of various gray scale display of the high current efficiency light emitting device.

The above Example I is explained by taking the example of a pixel circuit without the function of compensating the threshold voltage of the drive transistor. In specific implementation, the specific structure of the drive control module is not limited to the above structure provided by the embodiment of the present invention, it can also be other structures known by the skilled person in the art, which will not be defined here.

In the above pixel circuit provided by an embodiment of the present invention, the drive control module can also be used for compensating the threshold voltage of the drive transistor and/or compensating the power supply voltage drop (IR drop). The skilled person in the art knows other circuit structures that can be used for compensating the threshold voltage of the drive transistor and/or compensating the power supply voltage drop (IR drop), which will not be repeated here.

Example II

Figure 7:
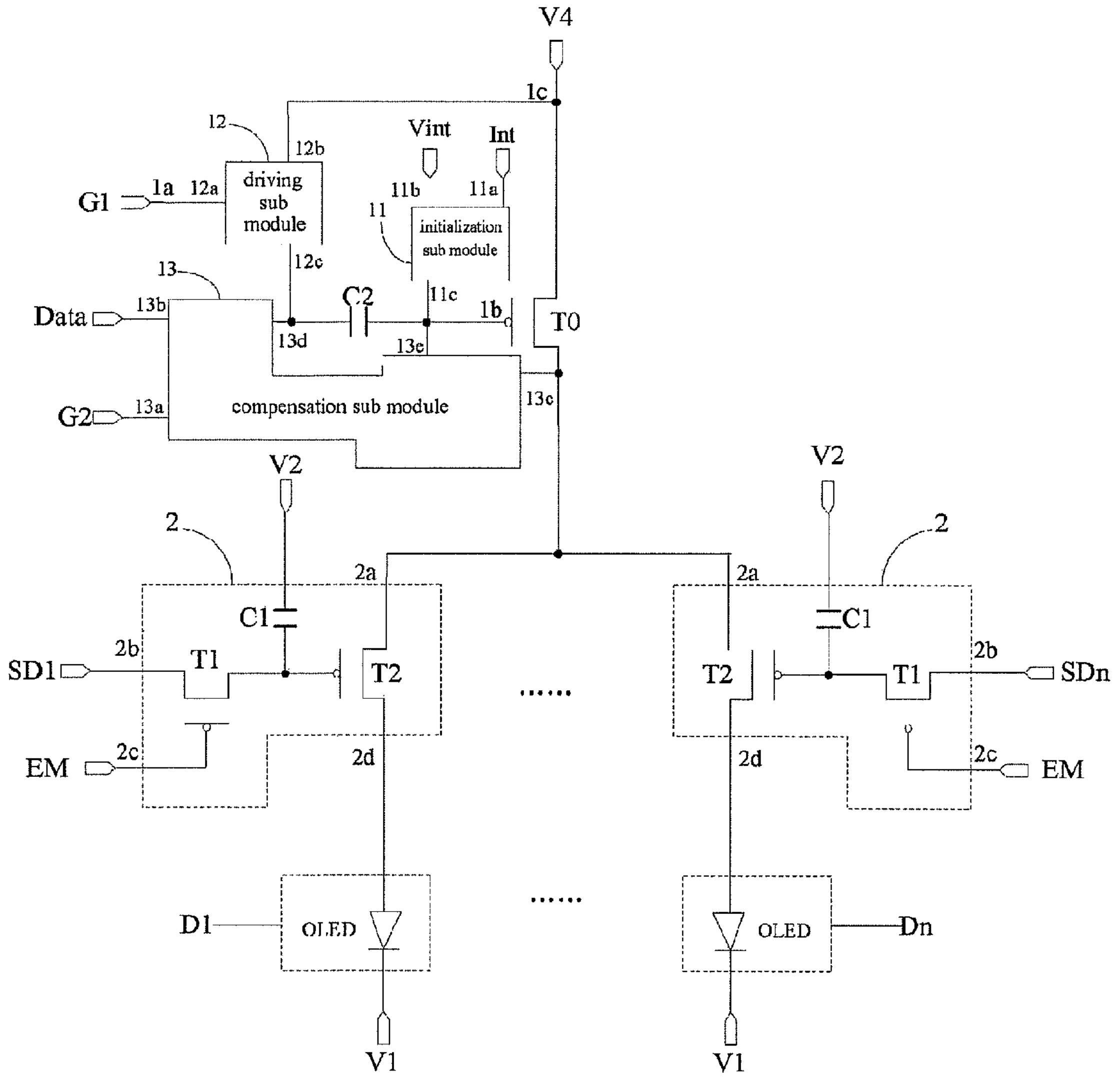
FIG. 7 is a sixth specific structural schematic view of a pixel circuit provided by an embodiment of the present invention.

As shown in FIG. 7, in the above pixel circuit provided by an embodiment of the present invention, the drive transistor is a P-type transistor. The drive control module 1 comprises: a second capacitor C2, an initialization sub module 11, a driving sub module 12 and a compensation sub module 13.

A first input terminal 11*a* of the initialization sub module 11 is used for receiving an initialization control signal Int, a second input terminal 11*b* thereof is used for receiving an initialization signal Vint, an output terminal 11*c* thereof is connected with the gate of the drive transistor T0. The initialization sub module 11 is used for providing the initialization signal Vint to the gate of the drive transistor T0 under the control of the initialization control signal Int.

A first input terminal 13*a* of the compensation sub module 13 is used for receiving a compensation control signal G2, a second input terminal 13*b* thereof is used for receiving a data signal Data, a first output terminal 13*d* thereof is connected with a first end of the second capacitor C2, a second output terminal 13*e* thereof is connected with a second end of the second capacitor C2, a third input terminal 13*c* thereof is connected with the drain of the drive transistor T0. The compensation sub module 13 is used for transmitting the data signal Data to the first end of the second capacitor C2 and transmitting the threshold voltage of the drive transistor T0 to the second end of the second capacitor C2 under the control of the compensation control signal G2.

A first input terminal 12*a* of the driving sub module 12 is used for receiving a drive control signal G1, a second input terminal 12*b* thereof is connected with the source of the drive transistor T0 and a fourth reference voltage source V4 respectively, an output terminal 12*c* thereof is connected with the first end of the second capacitor C2. The driving sub module 12 is used for controlling the drive transistor T0 to output a driving total current in cooperation with the second capacitor C2 under the control of the drive control signal G1.

The above Example II is only explained by taking the example of a pixel circuit having the function of compensating the threshold voltage of the drive transistor, there can be various implementing ways specifically, which will not be repeated here.

Example III

Figure 8A:
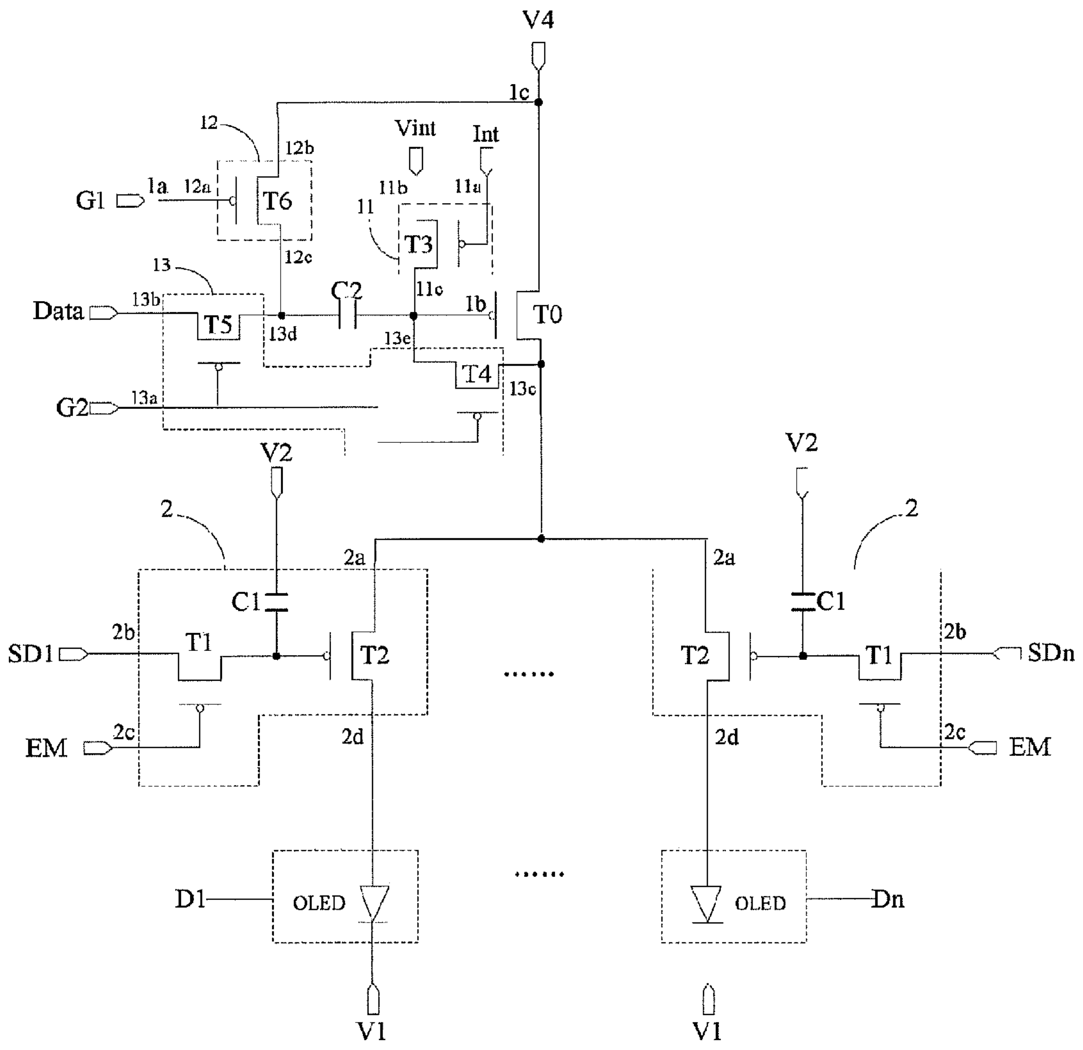
FIG. 8*a* is a seventh specific structural schematic view of a pixel circuit provided by an embodiment of the present invention.

In the above pixel circuit provided by an embodiment of the present invention, as shown in FIG. 8*a*, the initialization sub module can comprise: a third switch transistor T3.

A gate of the third switch transistor T3 is connected to the first input terminal 11*a* of the initialization sub module 11, a source thereof is connected with the second input terminal 11*b* of the initialization sub module 11, a drain thereof is connected with the output terminal 11*c* of the initialization sub module 11.

The third switch transistor T3 can be an N-type transistor, the third switch transistor T3 can also be a P-type transistor, which will not be defined here.

The above is only an illustration of the specific structure of the initialization sub module in the pixel circuit. In specific implementation, the specific structure of the initialization sub module is not limited to the above structure provided by the embodiment of the present invention, it can also be other structures known by the skilled person in the art, which will not be defined here.

In the above pixel circuit provided by an embodiment of the present invention, as shown in FIG. 8*a*, the compensation sub module 13 can comprise: a fourth switch transistor T4 and a fifth switch transistor T5.

A gate of the fourth switch transistor T4 is connected with the first input terminal 13*a* of the compensation sub module 13, a source thereof is connected with the second output terminal 13*e* of the compensation sub module 13, a drain thereof is connected with the third input terminal 13*c* of the compensation sub module 13.

A gate of the fifth switch transistor T5 is connected with the first input terminal 13*a* of the compensation sub module 13, a source thereof is connected with the second input terminal 13*b* of the compensation sub module 13, a drain thereof is connected with the first output terminal 13*d* of the compensation sub module 13.

The fourth switch transistor T4 and the fifth switch transistor T5 can be N-type transistors, the fourth switch transistor T4 and the fifth switch transistor T5 can also be P-type transistors, which will not be defined here.

The above is only illustration of the specific structure of the compensation sub module in the pixel circuit. In specific implementation, the specific structure of the compensation sub module is not limited to the above structure provided by the embodiment of the present invention, it can also be other structures known by the skilled person in the art, which will not be defined here.

In the above pixel circuit provided by an embodiment of the present invention, as shown in FIG. 8*a*, the driving sub module 12 can comprise: a sixth switch transistor T6.

A gate of the sixth switch transistor T6 is connected with the first input terminal 12*a* of the driving sub module 12, a source thereof is connected with the second input terminal 12*b* of the driving sub module 12, a drain thereof is connected with the output terminal 12*c* of the driving sub module 12.

The sixth switch transistor T6 can be an N-type transistor, the sixth switch transistor T6 can also be a P-type transistor, which will not be defined here.

The above is only illustration of the specific structure of the driving sub module in the pixel circuit. In specific implementation, the specific structure of the driving sub module is not limited to the above structure provided by the embodiment of the present invention, it can also be other structures known by the skilled person in the art, which will not be defined here.

In the above pixel circuit provided by an embodiment of the present invention, since the drive transistor T0 is a P-type transistor, the threshold voltage $V_{th}$ of the P-type transistor is a negative value. In order to ensure that the drive transistor T0 can work normally, the voltage of the first reference voltage source V1 is generally connected to the ground or a negative voltage, the voltage of the fourth reference voltage source V4 is generally a positive voltage.

Figure 8B:
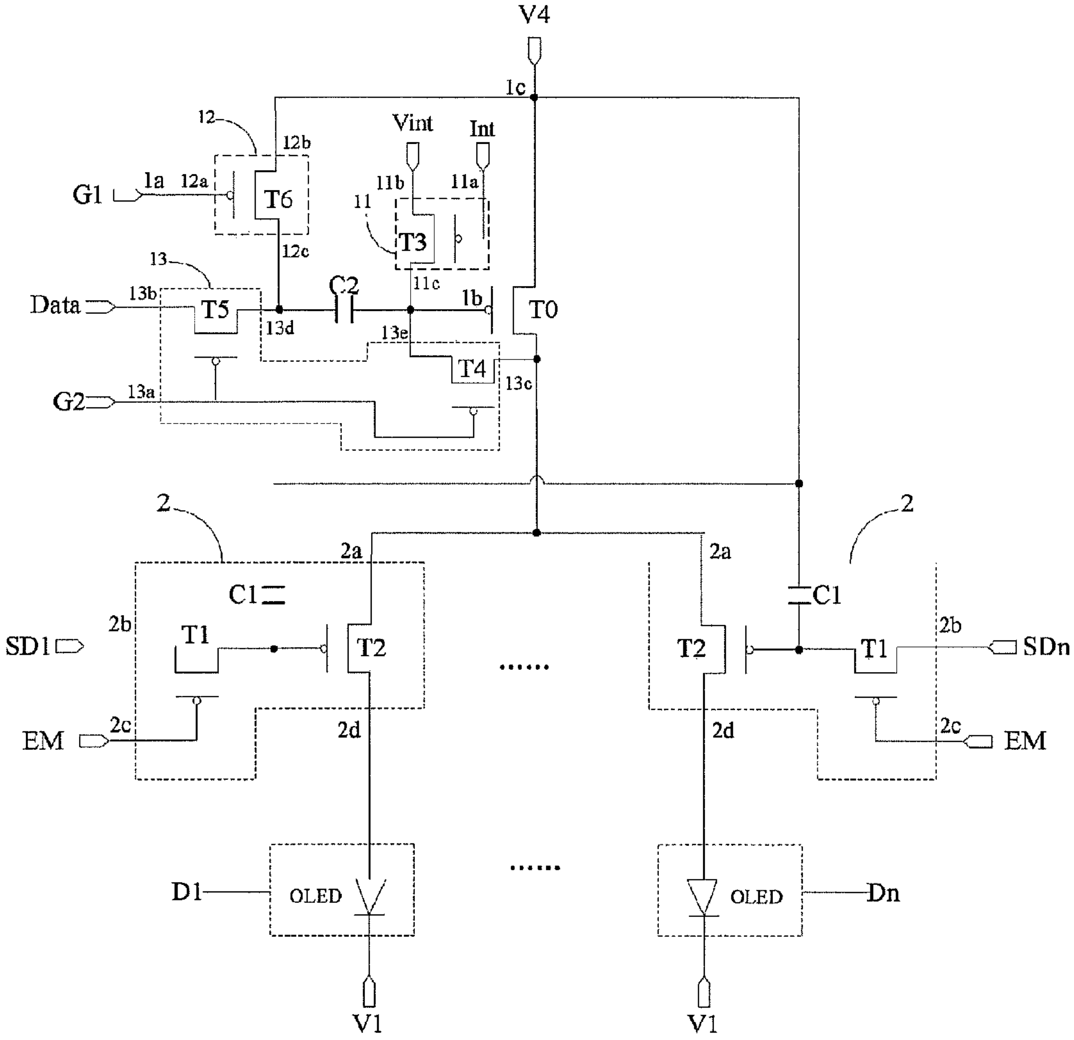
FIG. 8*b* is an eighth specific structural schematic view of a pixel circuit provided by an embodiment of the present invention.

As shown in FIG. 8*b*, the second reference voltage source V2 and the fourth reference voltage source V4 can be the same voltage source.

The drive transistor and the switch transistors mentioned in the above pixel circuit provided by an embodiment of the present invention can all adopt the design of P-type transistors, thus the fabricating process of the pixel circuit can be simplified.

Figure 9:
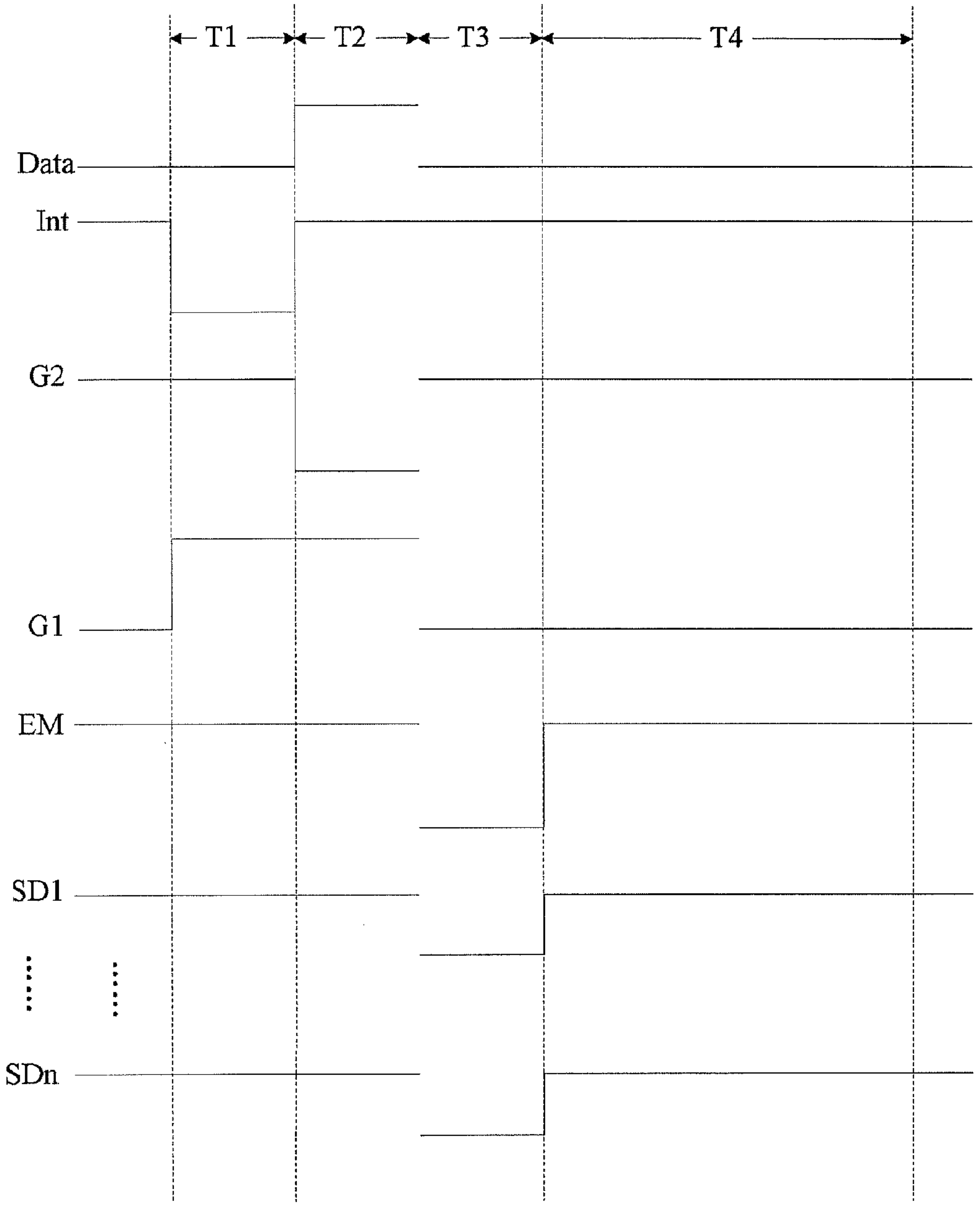
FIG. 9 is a timing schematic view of a pixel circuit as shown in FIG. 8*b;*

Next, the structure of the pixel circuit as shown in FIG. 8*b* will be taken as the example to describe its working process. The corresponding input timing diagram is as shown in FIG. 9. Four phases of T1, T2, T3 and T4 in the input timing diagram as shown in FIG. 9 are selected. In the following description, the high level signal is represented by 1, the low level signal is represented by 0.

In the phase of T1, Int=0, G1=1, G2=1, SD1 to SDn=1, EM=1. All the first switch transistors T1, all the second switch transistors T2, the fourth switch transistor T4, the fifth switch transistor T5 and the sixth switch transistor T6 are all in the cut-off state. The third switch transistor T3 is in the turn-on state. The voltage of the gate of the drive transistor T0 is $V_{int}$, the voltage of the source of the drive transistor T0 is V4.

In the phase of T2, Int=1, G1=1, G2=0, SD1 to SDn=1, EM=1. All the first switch transistors T1, all the second switch transistors T2, the third switch transistor T3 and the sixth switch transistor T6 are all in the cut-off state. The fourth switch transistor T4 and the fifth switch transistor T5 are in the turn-on state. The voltage of the gate of the drive transistor T0 becomes $V4+V_{th}$, the voltage of the source of the drive transistor T0 is V4, the voltage of the first end of the second capacitor C2 becomes $V_{Data}$.

In the phase of T3, Int=1, G1=0, G2=1, SD1 to SDn=0, EM=0. The third switch transistor T3, the fourth switch transistor T4 and the fifth switch transistor T5 are all in the cut-off state. The sixth switch transistor T6 is in the turn-on state, all the first switch transistors T1 are in the turn-on state. The turn-on degree of each second switch transistor T2 is determined by the corresponding SD. In this phase, the voltage of the first end of the second capacitor C2 becomes V4, according to the principle of conservation of electricity of the capacitor, the voltage of the second end of the second capacitor C2, i.e., the voltage of the gate of the drive transistor T0 becomes $2V4+V_{th}-V_{Data}$. The voltage of the source of the drive transistor T0 is V4, the driving total current signal outputted by the drive transistor T0 is $I_{total}=K(V_{GS}-V_{th})^2=K(2V4+V_{th}-_{Data}-V4-V_{th})^2=K(V4-V_{Data})_2$. Each light emitting device D emits light gradually under the control of the corresponding SD. Assume that there are only two split light emitting control modules in FIG. 8*b*, i.e., n=2. Under the control of SD1, the internal resistance of the second switch transistor T2 that corresponds to SD1 is R1. Under the control of SD2, the internal resistance of the second switch transistor T2 that corresponds to SD2 is R2. In this phase, the driving split current outputted by the second switch transistor T2 that corresponds to SD1 becomes $I_{total}R2/(R1+R2)$ gradually, the driving split current outputted by the second switch transistor T2 that corresponds to SD2 becomes $I_{total}R1/(R1+R2)$ gradually.

In the phase of T4, Int=1, G1=0, G2=1, SD1 to SDn=1, EM=1. The third switch transistor T3, the fourth switch transistor T4, the fifth switch transistor T5 and all the first switch transistor T1 are all in the cut-off state. The sixth switch transistor T6 is in the turn-on state. Due to the effect of the second capacitor C2, the voltage of the gate of the drive transistor T0 is still $2V4+V_{th}-V_{Data}$, the voltage of the source of the drive transistor T0 is still V4. The driving total current signal outputted by the drive transistor T0 is still $I_{total}=K(V4-V_{Data})^2$. Due to the effect of the first capacitor C1, the voltage of the gate of each second switch transistor T2 is still the corresponding SD in the phase of T3. Hence, in this phase, the driving split current outputted by the second switch transistor T2 that corresponds to SD1 is stabilized at $I_{total}R2/(R1+R2)$, the driving split current outputted by the second switch transistor T2 that corresponds to SD2 is stabilized at $I_{total}R1/(R1+R2)$. Each light emitting device emits light stably.

In the above pixel circuit provided by the embodiment of the present invention, since the plurality of split light emitting control modules can split the driving total current signal outputted by the drive transistor based on the corresponding split control signal, the driving split current signal outputted to the corresponding light emitting device can be less than the driving total current signal. In this way, on the basis of not changing the adjustment range of the voltage in the prior art, the driving current of the light emitting device under the same brightness can be reduced, thereby being capable of realizing adjustment of various gray scale display of the high current efficiency light emitting device. Moreover, in the above pixel circuit, since there is the compensation sub module, the driving total current signal outputted by the drive transistor is unrelated to the threshold voltage of the drive transistor. In this way, the problem of influence on the working current of the light emitting device caused by drift of the threshold voltage $V_{th}$ of the drive transistor due to the process procedure and long time operation is solved thoroughly, thereby improving display nonuniformity of the panel.

For the drive transistor and the switch transistor mentioned in the above embodiments of the present invention can be thin film transistors (TFT), and can also be metal oxide semiconductor field effect transistors (MOSFET), which will not be defined here. In some implementations, the source and the drain of these transistors can be interchanged, which are not differentiated specifically. When the specific embodiments are described, they are explained by taking the example that the drive transistor and the switch transistor are both thin film transistors.

Figure 10:
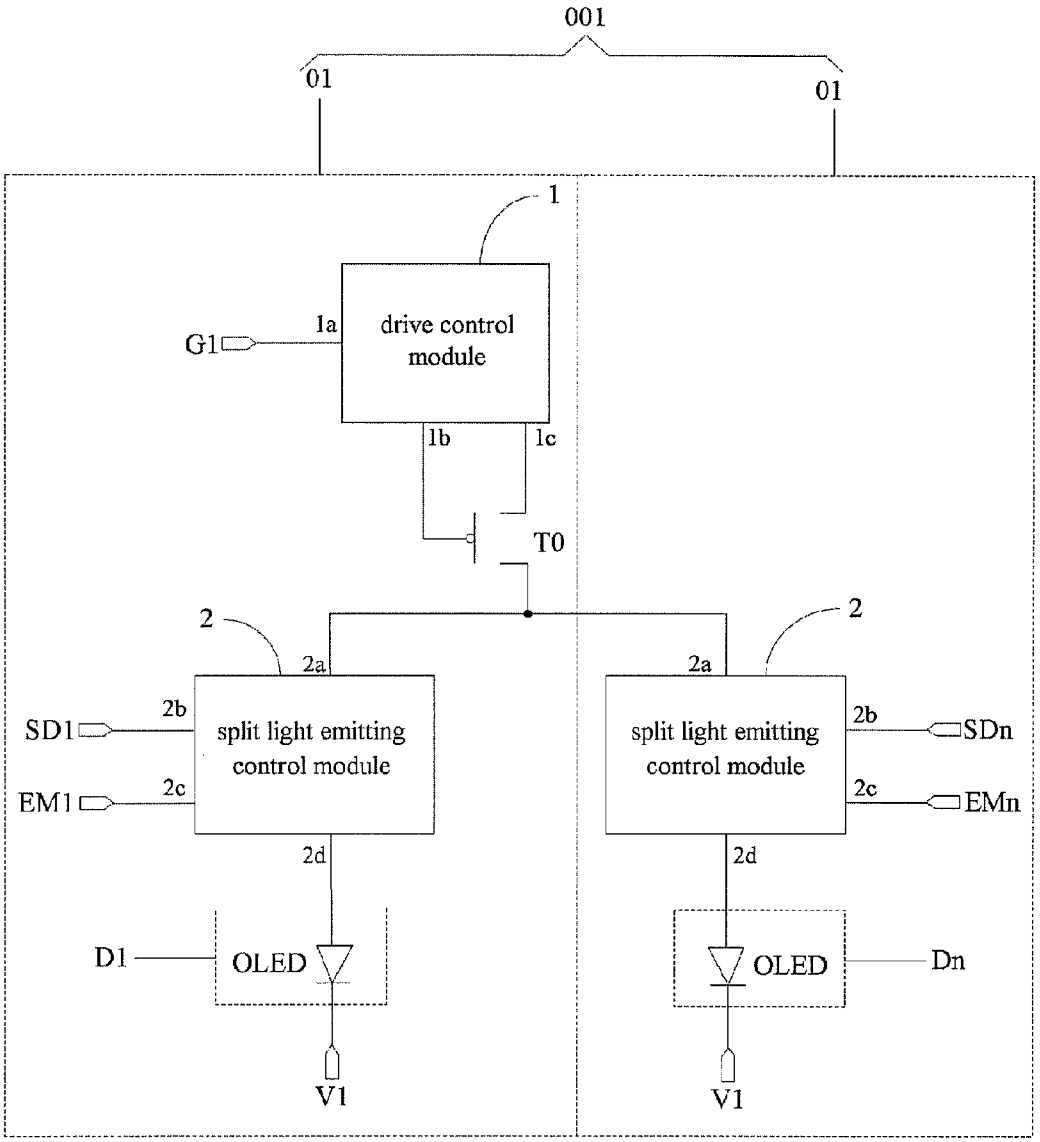
FIG. 10 is a structural schematic view of a pixel unit group in an organic electroluminescent display panel provided by an embodiment of the present invention.

Based on the same inventive concept, an embodiment of the present invention further provides an organic electroluminescent display panel comprising: pixel units arranged in a matrix and pixel circuits corresponding to respective pixel units. As shown in FIG. 10, at least two adjacent pixel units 01 along the row direction are taken as a pixel unit group 001, each of the pixel unit groups 001 corresponds to one of the above pixel circuits provided by the embodiments of the present invention, and the number of pixel units 01 in each of the pixel unit groups 001 equals to the number of the split light emitting control modules 2 in the corresponding pixel circuit. FIG. 10 takes the example that two pixel units 01 form a pixel unit group 001.

In the above organic electroluminescent display panel provided by the embodiment of the present invention, since the plurality of split light emitting control modules can split the driving total current signal outputted by the drive transistor based on the corresponding split control signal, the driving split current signal outputted to the corresponding light emitting device can be less than the driving total current signal. In this way, on the basis of not changing the adjustment range of the voltage in the prior art, the driving current of the light emitting device under the same brightness can be reduced, thereby realizing adjustment of various gray scale display of the high current efficiency light emitting device. Moreover, since a plurality of pixel units corresponds to one pixel unit group, the structure of the pixel circuit of one pixel unit group can be simplified, thereby improving pixel resolution of the product.

Based on the same inventive concept, an embodiment of the present invention further provides a display device comprising the above organic electroluminescent display panel provided by the embodiment of the present invention. The display device can be a display, a mobile phone, a television, a laptop, an all-in-one machine etc. Other essential components of the display device should all be understood by the ordinary skilled person in the art, which will not be repeated here, and should not be regarded as limitations to the present invention. The embodiments of the present invention provide a pixel circuit, an organic electroluminenscent display panel and a display device. The pixel circuit comprises: a drive transistor, a drive control module, at least two split light emitting control modules and light emitting devices connected with output terminals of the split light emitting control modules in one-to-one correspondence respectively. Since the plurality of split light emitting control modules can split the driving total current signal outputted by the drive transistor based on the corresponding split control signal, the driving split current signal outputted to the corresponding light emitting device can be less than the driving total current signal. In this way, on the basis of not changing the adjustment range of the voltage in the prior art, the driving current of the light emitting device under the same brightness can be reduced, thereby being capable of realizing adjustment of various gray scale display of the high current efficiency light emitting device.

As is apparent from the above written description, the skilled person in the art can make various modifications and variations to the present invention without departing from the spirit and scope of the present invention. In this way, provided that these modifications and variations of the present invention belong to the scopes of the claims of the present invention and the equivalent technologies thereof, the present invention also intends to cover these modifications and variations.

The invention claimed is:

1. A pixel circuit, comprising: a drive transistor, a drive control module, at least two split light emitting control modules and light emitting devices connected with output terminals of the split light emitting control modules in one-to-one correspondence respectively;

wherein an input terminal of the drive control module is used for receiving a drive control signal, a first output terminal of the drive control module is connected with a gate of the drive transistor, a second output terminal of the drive control module is connected with a source of the drive transistor; the drive control module is used for controlling the drive transistor to output a driving total current signal under the control of the drive control signal;

a first input terminal of each of the split light emitting control modules is connected with a drain of the drive transistor, a second input terminal thereof is used for receiving a corresponding split control signal, a third input terminal thereof is used for receiving a corresponding light emitting control signal, an output terminal thereof is connected with one end of a corresponding light emitting device; the other end of the light emitting device is connected with a first reference voltage source; each of the split light emitting control modules is used for splitting the driving total current signal outputted by the drain of the drive transistor according to the corresponding split control signal under the control of the corresponding light emitting control signal, forming a driving split current signal to which the corresponding split control signal corresponds, and providing the formed driving split current signal to the corresponding light emitting device.

2. The pixel circuit as claimed in claim 1, wherein the split light emitting control module comprises:

a first switch transistor, a gate thereof being connected with the third input terminal of the split light emitting control module, a source thereof being connected with the second input terminal of the split light emitting control module, a drain thereof being connected with a gate of a second switch transistor and a first end of a first capacitor;

a second switch transistor, a source thereof being connected with the first input terminal of the split light emitting control module, a drain thereof being connected with the output terminal of the split light emitting control module;

a second end of the first capacitor being connected with a second reference voltage source.

3. The pixel circuit as claimed in claim 2, wherein each of the split light emitting control modules corresponds to a same light emitting control signal.

4. The pixel circuit as claimed in claim 2, wherein the first switch transistor and the second switch transistor are both P-type transistors or N-type transistors.

5. The pixel circuit as claimed in claim 1, wherein the drive transistor is a P-type transistor or an N-type transistor.

6. The pixel circuit as claimed in claim 5, wherein the drive control module comprises:

a third switch transistor, a gate thereof being used for receiving the drive control signal, a source thereof being used for receiving a data signal, a drain thereof being connected with a first end of a second capacitor and the gate of the drive transistor respectively, a second end of the second capacitor being connected with a third reference voltage source and the source of the drive transistor respectively.

7. The pixel circuit as claimed in claim 5, wherein the drive control module is further used for compensating a threshold voltage of the drive transistor; and/or compensating a power supply voltage drop.

8. The pixel circuit as claimed in claim 7, wherein the drive transistor is a P-type transistor; the drive control module comprises:

an initialization sub module, a first input terminal thereof being used for receiving an initialization control signal, a second input terminal thereof being used for receiving an initialization signal, an output terminal thereof being connected with the gate of the drive transistor; the initialization sub module being used for providing the initialization signal to the gate of the drive transistor under the control of the initialization control signal;

a compensation sub module, a first input terminal thereof being used for receiving a compensation control signal, a second input terminal thereof being used for receiving a data signal, a first output terminal thereof being connected with the first end of the second capacitor, a second output terminal thereof being connected with the second end of the second capacitor, a third input terminal thereof being connected with the drain of the drive transistor; the compensation sub module being used for transmitting the data signal to the first end of the second capacitor and transmitting the threshold voltage of the drive transistor to the second end of the second capacitor under the control of the compensation control signal;

a driving sub module, a first input terminal thereof being used for receiving the drive control signal, a second input terminal thereof being connected with the source of the drive transistor and a fourth reference voltage source respectively, an output terminal thereof being connected with the first end of the second capacitor; the driving sub module being used for controlling the drive transistor to output a driving total current in cooperation with the second capacitor under the control of the drive control signal.

9. The pixel circuit as claimed in claim 8, wherein the initialization sub module comprises:

a third switch transistor, a gate thereof being connected with the first input terminal of the initialization sub module, a source thereof being connected with the second input terminal of the initialization sub module, a drain thereof being connected with the output terminal of the initialization sub module.

10. The pixel circuit as claimed in claim 8, wherein the compensation sub module comprises:

a fourth switch transistor, a gate thereof being connected with the first input terminal of the compensation sub module, a source thereof being connected with the second output terminal of the compensation sub module, a drain thereof being connected with the third input terminal of the compensation sub module;

a fifth switch transistor, a gate thereof being connected with the first input terminal of the compensation sub module, a source thereof being connected with the second input terminal of the compensation sub module, a drain thereof being connected with the first output terminal of the compensation sub module.

11. The pixel circuit as claimed in claim 8, wherein the driving sub module comprises:

a sixth switch transistor, a gate thereof being connected with the first input terminal of the driving sub module, a source thereof being connected with the second input terminal of the driving sub module, a drain thereof being connected with the output terminal of the driving sub module.

12. An organic electroluminescent display panel, comprising: pixel units arranged in a matrix and pixel circuits corresponding to respective pixel units, wherein at least two adjacent pixel units along the row direction are taken as a pixel unit group, each of the pixel unit groups corresponds to a pixel circuit as claimed in claim 1, and the number of pixel units in each of the pixel unit groups equals to the number of the split light emitting control modules in the corresponding pixel circuit.

13. The organic electroluminescent display panel as claimed in claim 12, wherein the split light emitting control module comprises:

a first switch transistor, a gate thereof being connected with the third input terminal of the split light emitting control module, a source thereof being connected with the second input terminal of the split light emitting control module, a drain thereof being connected with a gate of a second switch transistor and a first end of a first capacitor;

a second switch transistor, a source thereof being connected with the first input terminal of the split light emitting control module, a drain thereof being connected with the output terminal of the split light emitting control module;

a second end of the first capacitor being connected with a second reference voltage source.

14. The organic electroluminescent display panel as claimed in claim 13, wherein the drive control module comprises:

a third switch transistor, a gate thereof being used for receiving the drive control signal, a source thereof being used for receiving a data signal, a drain thereof being connected with a first end of a second capacitor and the gate of the drive transistor respectively, a second end of the second capacitor being connected with a third reference voltage source and the source of the drive transistor respectively.

15. The organic electroluminescent display panel as claimed in claim 14, wherein the drive control module is further used for compensating a threshold voltage of the drive transistor; and/or compensating a power supply voltage drop.

16. The organic electroluminescent display panel as claimed in claim 15, wherein the drive transistor is a P-type transistor; the drive control module comprises:

an initialization sub module, a first input terminal thereof being used for receiving an initialization control signal, a second input terminal thereof being used for receiving an initialization signal, an output terminal thereof being connected with the gate of the drive transistor; the initialization sub module being used for providing the initialization signal to the gate of the drive transistor under the control of the initialization control signal;

a compensation sub module, a first input terminal thereof being used for receiving a compensation control signal, a second input terminal thereof being used for receiving a data signal, a first output terminal thereof being connected with the first end of the second capacitor, a second output terminal thereof being connected with the second end of the second capacitor, a third input terminal thereof being connected with the drain of the drive transistor; the compensation sub module being used for transmitting the data signal to the first end of the second capacitor and transmitting the threshold voltage of the drive transistor to the second end of the second capacitor under the control of the compensation control signal;

a driving sub module, a first input terminal thereof being used for receiving the drive control signal, a second input terminal thereof being connected with the source of the drive transistor and a fourth reference voltage source respectively, an output terminal thereof being connected with the first end of the second capacitor; the driving sub module being used for controlling the drive transistor to output a driving total current in cooperation with the second capacitor under the control of the drive control signal.

17. The organic electroluminescent display panel as claimed in claim 16, wherein the initialization sub module comprises:

a third switch transistor, a gate thereof being connected with the first input terminal of the initialization sub module, a source thereof being connected with the second input terminal of the initialization sub module, a drain thereof being connected with the output terminal of the initialization sub module.

18. The organic electroluminescent display panel as claimed in claim 16, wherein the compensation sub module comprises:

a fourth switch transistor, a gate thereof being connected with the first input terminal of the compensation sub module, a source thereof being connected with the second output terminal of the compensation sub module, a drain thereof being connected with the third input terminal of the compensation sub module;

a fifth switch transistor, a gate thereof being connected with the first input terminal of the compensation sub module, a source thereof being connected with the second input terminal of the compensation sub module, a drain thereof being connected with the first output terminal of the compensation sub module.

19. The organic electroluminescent display panel as claimed in claim 16, wherein the driving sub module comprises:

a sixth switch transistor, a gate thereof being connected with the first input terminal of the driving sub module, a source thereof being connected with the second input terminal of the driving sub module, a drain thereof being connected with the output terminal of the driving sub module.

20. A display device, comprising the organic electroluminescent display panel as claimed in claim 12.

* * * * *